Figure 1:
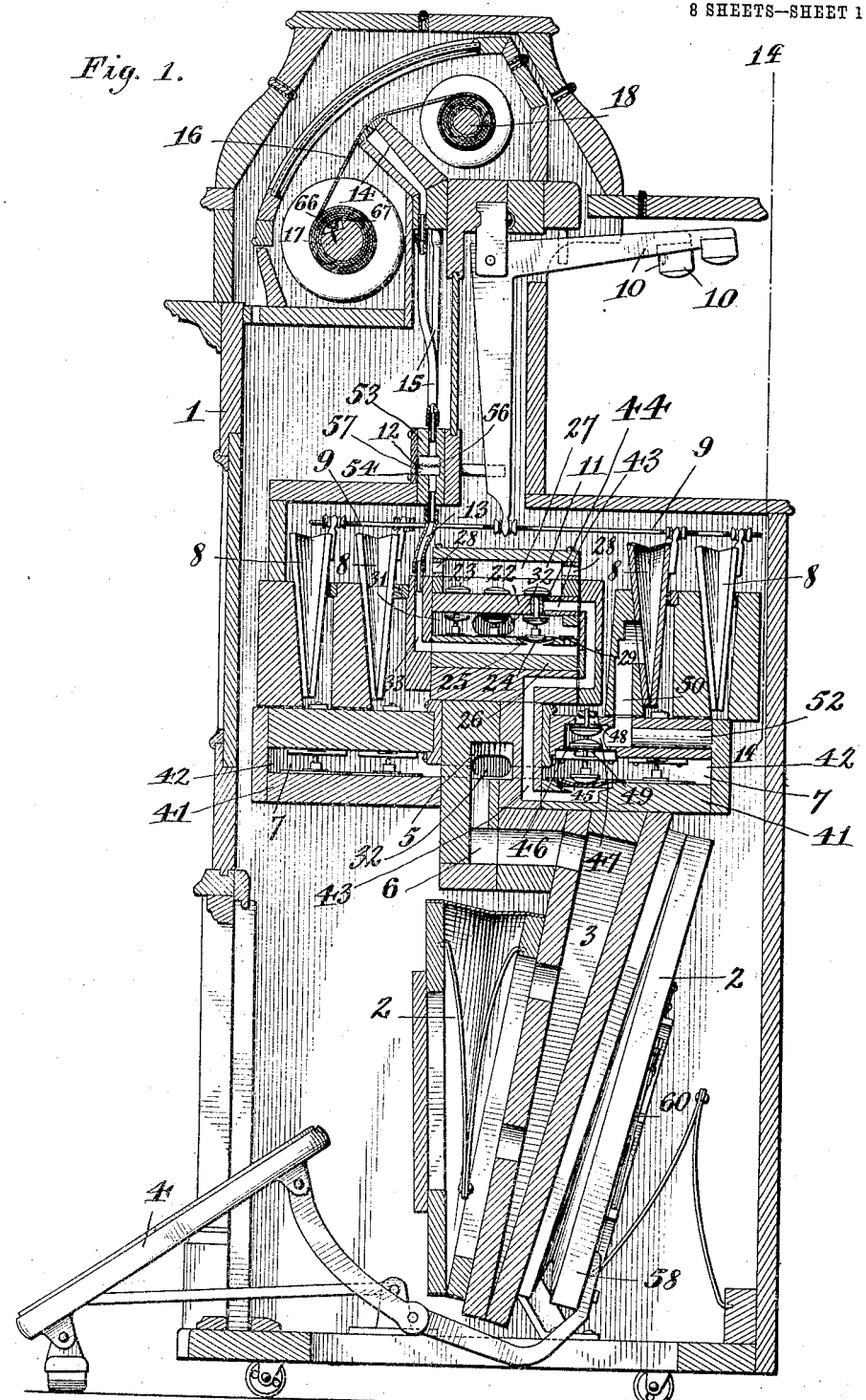

No. 828,877. PATENTED AUG. 21, 1906.
J. H. CHASE & W. F. BAYER.
AUTOMATIC PLAYER FOR MUSICAL INSTRUMENTS.
APPLICATION FILED JAN. 3, 1905.

8 SHEETS—SHEET 1.

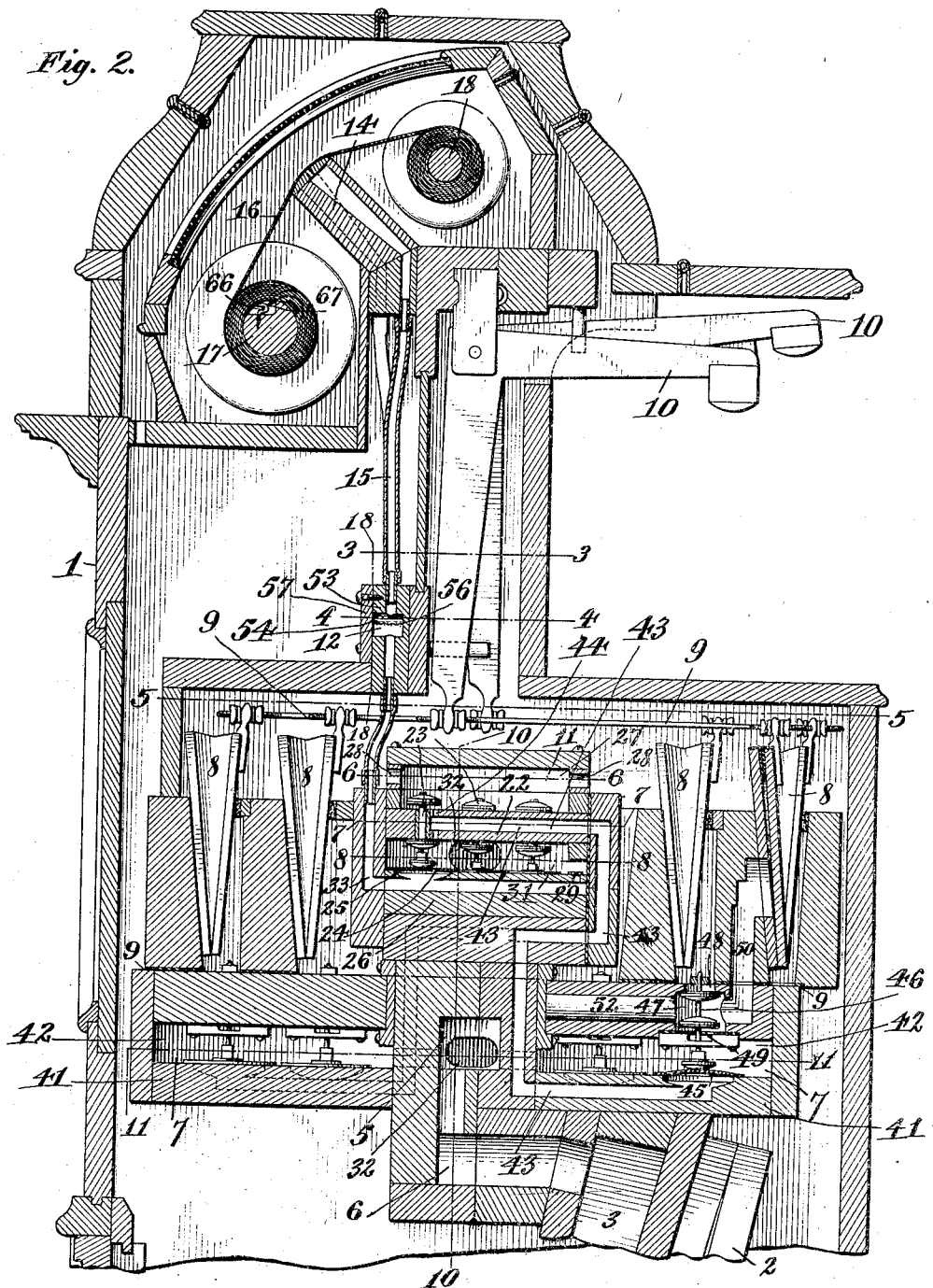

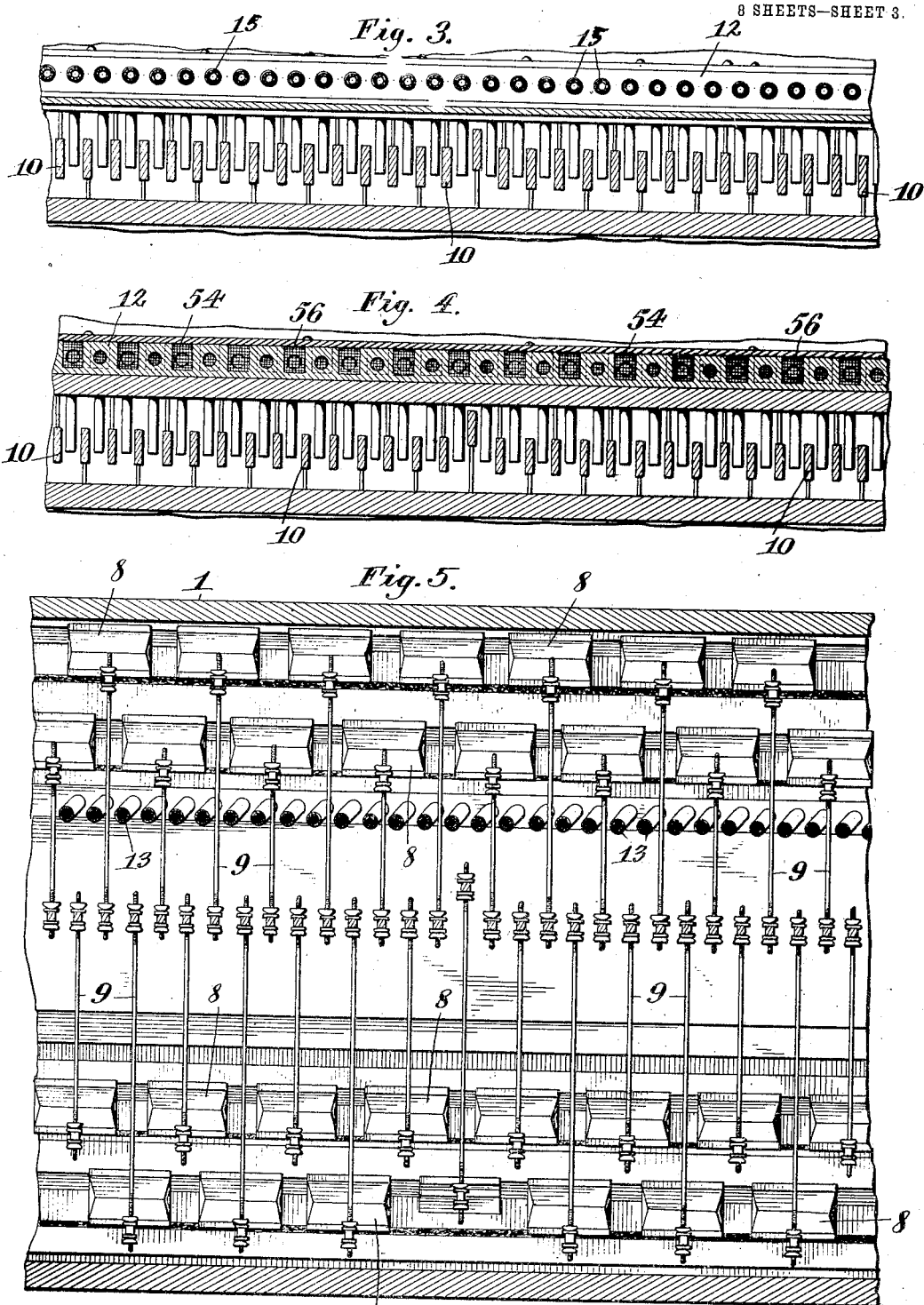

No. 828,877. PATENTED AUG. 21, 1906.
J. H. CHASE & W. F. BAYER.
AUTOMATIC PLAYER FOR MUSICAL INSTRUMENTS.
APPLICATION FILED JAN. 3, 1905.

8 SHEETS—SHEET 4.

Witnesses: J. H. Chase and W. F. Bayer, Inventors.

By Neuhert & Burkhart
Attorneys.

No. 828,877. PATENTED AUG. 21, 1906.
J. H. CHASE & W. F. BAYER.
AUTOMATIC PLAYER FOR MUSICAL INSTRUMENTS.
APPLICATION FILED JAN. 3, 1905.

8 SHEETS—SHEET 5.

Witnesses: J. H. Chase & W. F. Bayer, Inventors.
By Neuhart & Burkhart
Attorneys.

No. 828,877. PATENTED AUG. 21, 1906.
J. H. CHASE & W. F. BAYER.
AUTOMATIC PLAYER FOR MUSICAL INSTRUMENTS.
APPLICATION FILED JAN. 3, 1905.
8 SHEETS—SHEET 6.
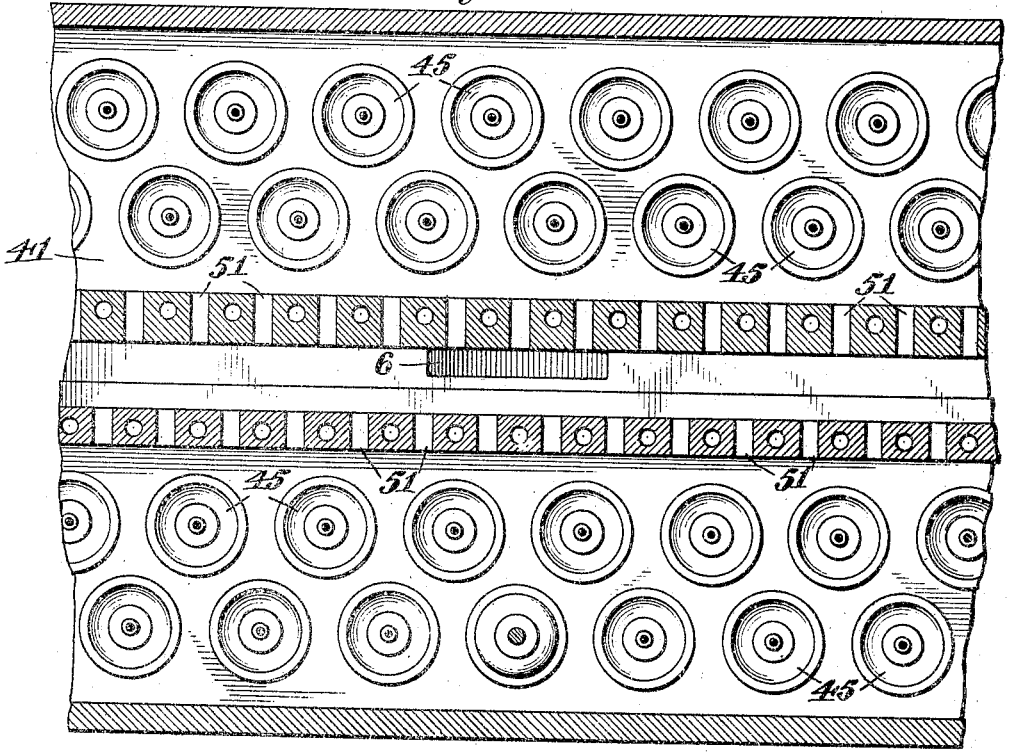
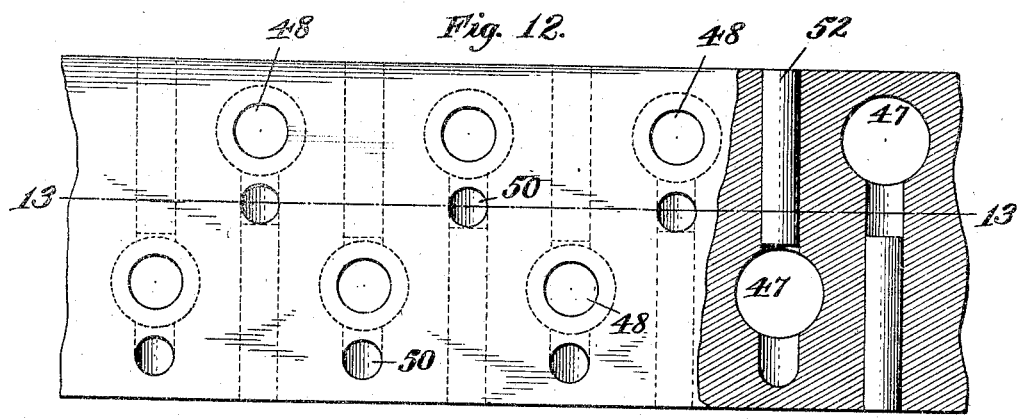
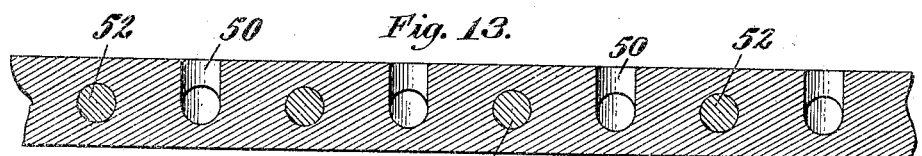

No. 828,877. PATENTED AUG. 21, 1906.
J. H. CHASE & W. F. BAYER.
AUTOMATIC PLAYER FOR MUSICAL INSTRUMENTS.
APPLICATION FILED JAN. 3, 1905.
8 SHEETS—SHEET 7.
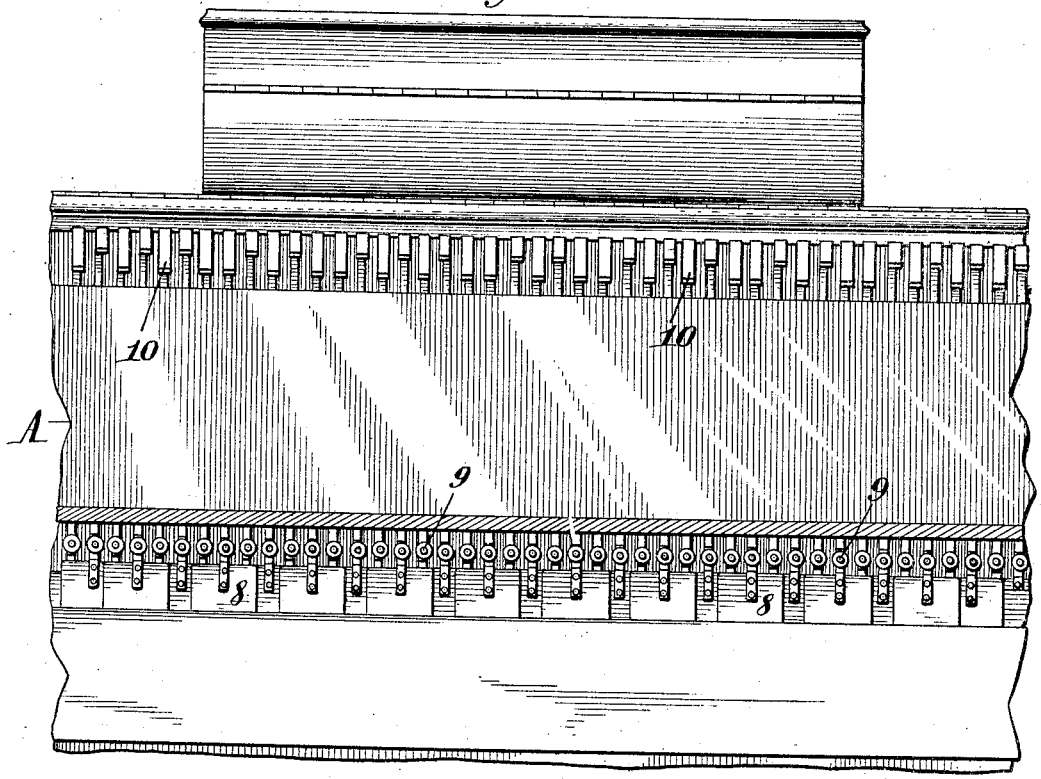
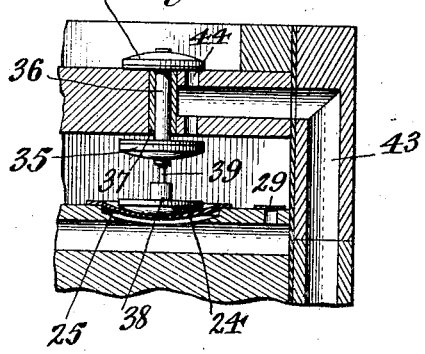
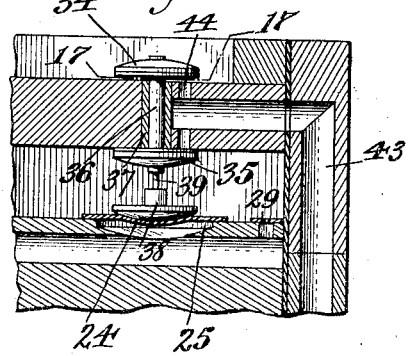
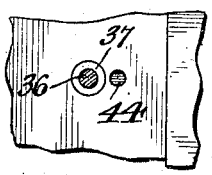
Witnesses:
Julius Lauter
May Sewert
J. H. Chase and
W. F. Bayer,
Inventors
By Neuhart Burkhart
Attorneys.

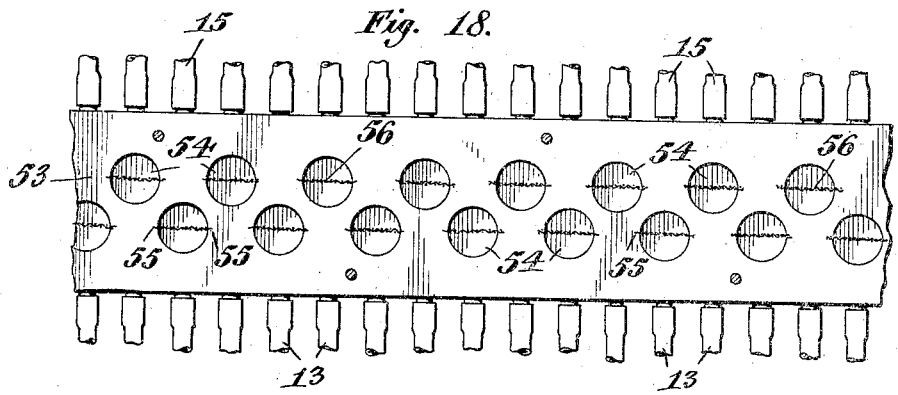
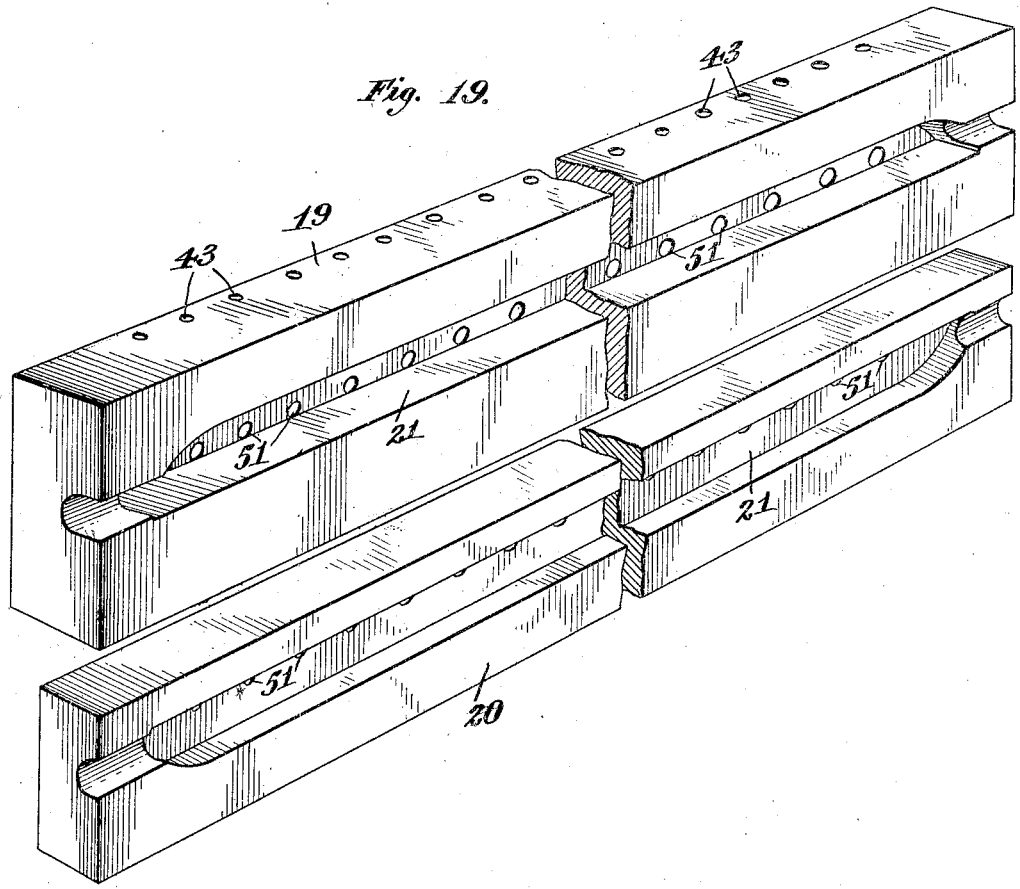

UNITED STATES PATENT OFFICE.

JOSEPH HERBERT CHASE AND WILLIAM FREDERICK BAYER, OF BUFFALO, NEW YORK, ASSIGNORS TO CHASE AND BAKER COMPANY, OF BUFFALO, NEW YORK, A CORPORATION OF NEW YORK.

AUTOMATIC PLAYER FOR MUSICAL INSTRUMENTS.

No. 828,877.    Specification of Letters Patent.    Patented Aug. 21, 1906.

Application filed January 2, 1905. Serial No. 239,452.

*To all whom it may concern:*

Be it known that we, JOSEPH HERBERT CHASE and WILLIAM FREDERICK BAYER, citizens of the United States, residing at Buffalo, in the county of Erie and State of New York, have invented certain new and useful Improvements in Automatic Players for Musical Instruments, of which the following is a specification.
This invention relates to improvements in automatic players for musical instruments and may be embodied in a musical instrument or as a separate player adapted to be placed into operative relation to a musical instrument.

The objects of our invention are to provide a simple and durable automatic player in which compact and substantial mechanism is provided for the purpose of acting upon the keys of a piano, organ, or other similar musical instrument; to provide means to collect the dirt and dust in the initial portion of the air-passages; to prevent the entrance of the same to the primary-valve chamber, and to construct the apparatus so that all parts thereof are easily accessible for cleaning, repairs, &c.

Other objects are to so construct the apparatus that binding of the working parts and the possibility of disarrangement of all parts from shrinking or swelling are entirely avoided; to arrange the various parts so that uniform lengths of channels or passages are provided between the exhaust-chamber and the pneumatics whereby quick response is obtained to the entrance of air to any air-passage; to form a substantial central exhaust-chamber which permits of building the secondary-valve chambers onto the same at opposite sides thereof, and to support the pneumatics on the secondary-valve chambers.

Still further objects are to provide the unused portions of the bores in the secondary-valve boards with strengthening - plugs, which in addition to strengthening said boards serve also to prevent warping or splitting of the same, said boards being greatly weakened by the many bores and passages formed in the same; to guide the primary-valve stems in bushings passing through the valve-boards, which arrangement avoids shrinkage and consequent leakage of air and assures a uniform quantity of air being supplied to the secondary valves, thus preventing hammering of the secondary valves, and to otherwise improve on automatic players now in use.

To these ends the invention consists in the construction, arrangement, and combination of parts to be hereinafter described, and particularly pointed out in the appended claims.

Figure 6:
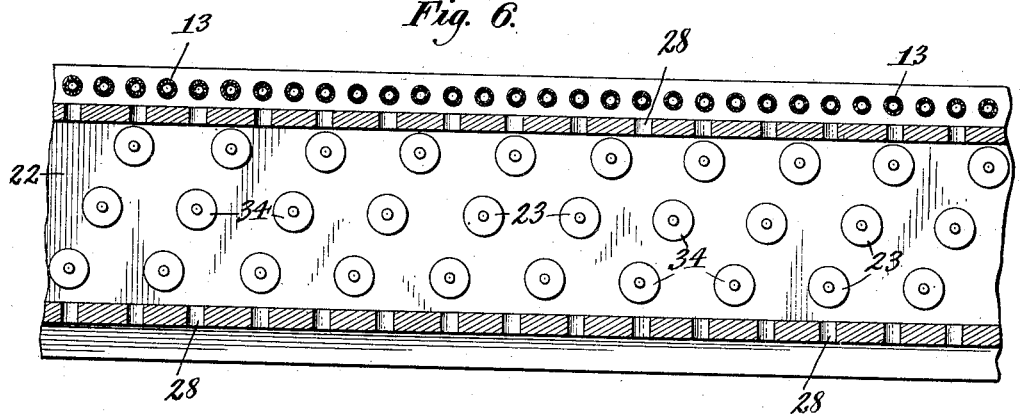
Figure 7:
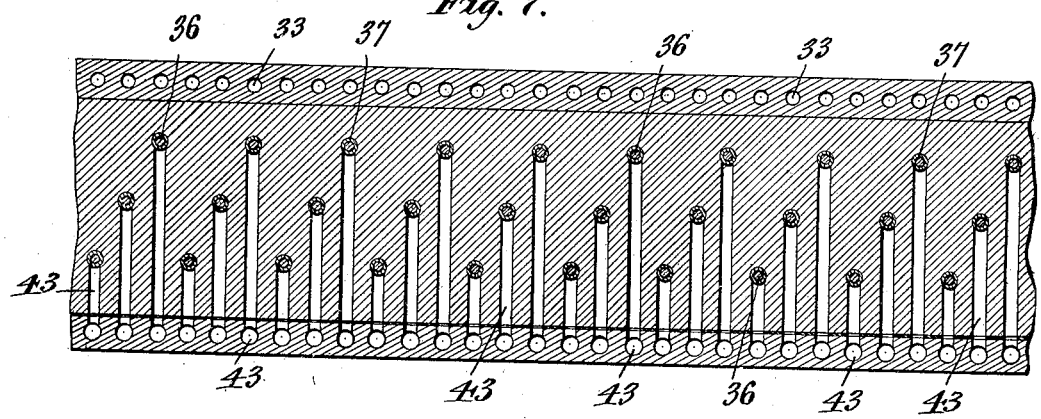
Figure 8:
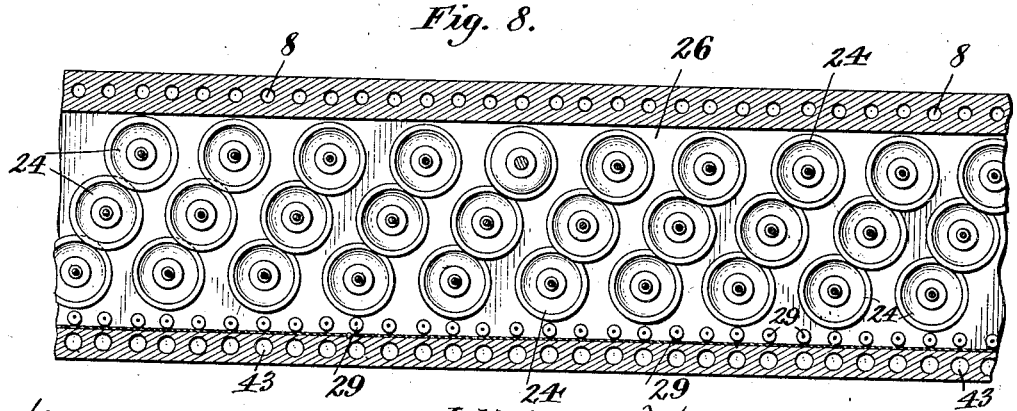
Figure 9:
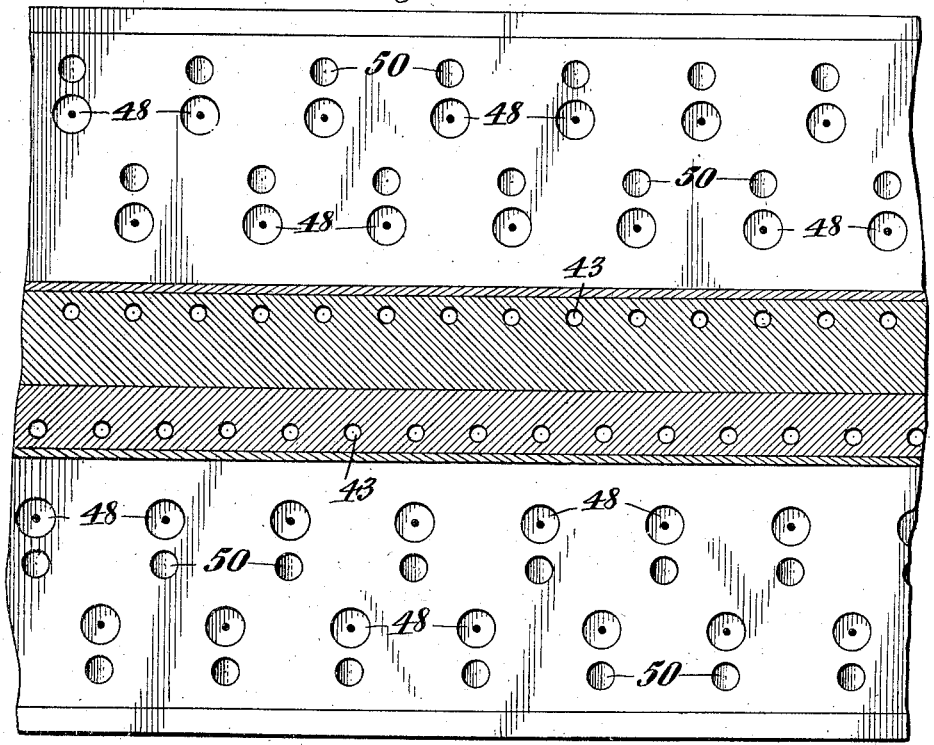
Figure 10:
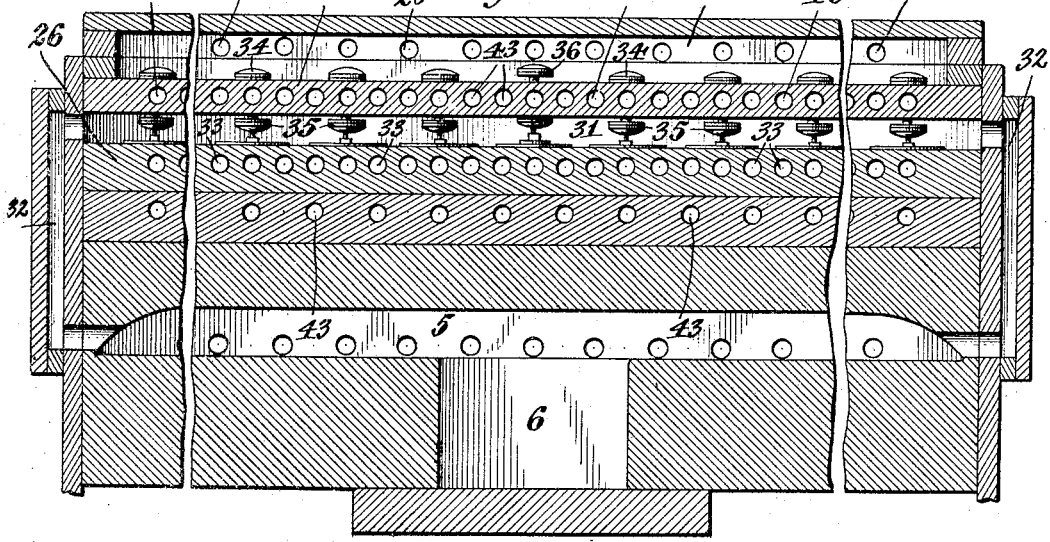

In the drawings, Figure 1 is a vertical transverse section of our improved automatic player for musical instruments. Fig. 2 is an enlarged vertical section of the upper portion of the same. Fig. 3 is a horizontal section through a portion of the player, taken on line 3 3, Fig. 2. Fig. 4 is a horizontal section through a portion of the player, taken on line 4 4, Fig. 2. Fig. 5 is a horizontal section through a portion of the player, taken on line 5 5, Fig. 2. Fig. 6 is a horizontal section through a portion of the player, taken on line 6 6, Fig. 2. Fig. 7 is a horizontal section through a portion of the player, taken on line 7 7, Fig. 2. Fig. 8 is a horizontal section through a portion of the player, taken on line 8 8, Fig. 2. Fig. 9 is a horizontal section through a portion of the player, taken on line 9 9, Fig. 2. Fig. 10 is a broken vertical longitudinal section taken on line 10 10, Fig. 2. Fig. 11 is a horizontal section through a portion of the player, taken on line 11 11, Fig. 2. Fig. 12 is a sectional plan view of one of the secondary-valve boards. Fig. 13 is a horizontal section taken on line 13 13, Fig. 12. Fig. 14 is a sectional elevation of a portion of the player, taken on line 14 14, Fig. 1. Fig. 15 is a vertical section of a portion of the primary-valve board and the primary-pouch board, showing one of the primary valves, the air-duct controlled thereby, and the air-duct through which the air is led to control the said valve, the parts being in their normal position. Fig. 16 is a similar section showing the valve elevated. Fig. 17 is a section taken on line 17 17, Fig. 16. Fig. 18 is an enlarged vertical section taken on line 18 18, Fig. 2. Fig. 19 is a broken perspective view of the two parts of the central wind-chamber, the parts being separated to show the formation of the interior.

Referring to the drawings in detail, like numerals of reference refer to like parts in the several figures.

The apparatus shown herein is adapted for use in connection with a piano or similar musical instruments and is an independent whole; but, if desired, the several parts thereof can be confined within the case of a piano or other similar musical instrument and form an inseparable part thereof. However, we prefer the arrangement herein shown, in which the apparatus is moved into operative relation with the keyboard of a piano or similar instrument.

The reference-numeral 1 designates the casing, in which the various operative parts of our player are confined. 2 represents the exhaust-bellows, which are attached to and communicate with an exhaust-chamber 3. These parts and the foot-pedals 4, which are attached thereto, may be of any common construction.

Arranged centrally within the casing is an exhaust-chamber 5, which is in communication with the exhaust-chamber 3 by a passage 6. The exhaust-chamber 5 is formed in two pieces to form a rigid and substantial structure, and lying on opposite sides of the same are the secondary-valve chambers 7, on which are mounted the pneumatics 8, controlled in the usual manner by the opening and closing of the corresponding actuating mechanism in the secondary-valve chamber. To the upper end of each pneumatic an actuating-rod 9 is attached, which has connection with the lower end of a key-actuating finger 10, having its free end projecting out of the casing and held in operative relation to the corresponding key of the piano-keyboard.

Mounted on the exhaust-chamber 5 is a primary-valve chamber 11, connected with a dust-collecting chamber 12 by a series of air-tubes 13, said dust-collecting chamber being also connected with the tracker-board 14 by a series of tubes 15. As is common in automatic players, the perforated music-sheet 16, which controls the admission of air through the tracker-board, passes over the latter and is automatically unwound from the roll 18, to which it is secured, and wound onto a take-up roll 17 to allow the admission of air through the several openings in the tracker-board as they are uncovered by the music-sheet.

The central exhaust-chamber 5 comprises two sections 19 20, secured together in any suitable manner and having in their opposing faces longitudinal grooves 21, which form the air-chamber 5. This arrangement permits of a very solid construction, onto which may be joined the secondary-valve chambers and the primary-valve chambers, while supporting in addition thereto the pneumatics carried on the secondary-valve chambers.

The primary-valve chamber is provided with a valve-board 22, having therein a series of valves 23, controlled by pneumatic pouches 24, covering openings 25 in the pouch-board 26, which latter is arranged below the valve-board and separated therefrom by an air-chamber 31, communicating with the exhaust-chamber 5 by end air-passages 32. (See Fig. 10.) Above the valve-board is an air-chamber 27, which is in communication with the outer air through air-passages 28. Formed in the pouch-board are air-vents 29, which allow the air acting against the pneumatic pouches to escape when the corresponding openings in the tracker-board are closed, thereby permitting said pouches to assume their normal condition. Connecting said pouch-opening 25 with one of the air-inlet tubes 13 is an air-passage 33, which directs the air against the under side of the corresponding pouch as it enters said tubes and causes the latter to be deflected upward. The axis of each valve 23 is coincident with the center of one of said pouches, and they comprise two valve-disks 34 35, connected by a stem 36 and lying, respectively, above and below the valve-board. The stems of said valves pass through bushings 37, which are secured in the valve-board, which construction prevents warping at this point and also prevents the leakage of air. The bushings are formed by inserting hardwood plugs into bores formed in the valve-board, the grain of which crosses the grain of the said board, and therefore prevents shrinking and swelling of the same. The plugs are bored centrally to form the bushings 37, hereinbefore noted. This construction allows free action to the valve-stems and assumes positive closure against the air, as no leakage can occur at the valve-stem. A pallet 38 is secured to each valve by a stem 39 and lies against or is secured to the upper face of the coinciding pouch.

Each of the secondary-valve chambers is also provided with a pouch-board 41, separated from the secondary-valve board, to be hereinafter described, by an exhaust-chamber 42. An air-passage 43 connects each primary valve with the corresponding secondary pouch, and in the primary-valve board air-apertures 44 are formed, which connect the passages 43 with the air-chambers above and below the valve-boards, said apertures lying adjacent the bushings 37 and being adapted to be closed by the valve-disks 34 35. The secondary-pouch board, as is common, is provided with the usual pneumatic pouches 45, which coöperate with valves 46 in the secondary-valve board. Each of the secondary valves lies within a chamber 47 in the valve-board, which communicates, through openings 48, with the outer air, and through openings 49 with the exhaust-chamber 42, which openings are adapted to be closed by said valves, each of said chambers being in communication with the corresponding pneumatic by a passage 50. Horizontal air-passages 51 connect the exhaust-chamber 5 with the exhaust-chambers 42 in the secondary-valve chambers, and by reason of said valve-chambers being affixed to opposite sides of the exhaust-chamber 5 and the pneumatics carried by said exhaust-chamber said passages 51 are of uniform length, as are the passages 50 leading to the pneumatics, which assures uniform action, and by reason of the secondary-valve chambers and the striking-pneumatics being arranged in two sets or series on opposite sides of a central exhaust-chamber the air passages or channels connecting said parts can be made short and direct, which in addition to uniform action produced for the reason above stated assures quick and positive action. Furthermore, by arranging the exhaust-chamber common to all secondary valves in a central position it may be supported firmly and made substantial, so that it is not likely to spring and cause leakage at points where other parts are attached thereto.

As shown in the drawings, the chambers 47 in the secondary-valve chambers are each formed by boring into the valve-board from the under side, and the portions of the passages 50 within said valve-boards are formed by boring into the latter from the top and then connecting the portions thus bored with the chambers 47 by horizontal bores extending from the edges of the boards to the chambers. It is therefore apparent that the secondary-valve boards are greatly weakened by the many passages formed therein and are liable to shrink and warp. To avoid this, plugs 52 are driven into the horizontal bores, so that the inner ends thereof terminate at the vertical portions of the passages 50 or at the edges of the chambers 47 when the latter lie between the passages 50 and the plugs, and as the grain of the boards cross the grain in the plugs the valve-boards are greatly strengthened and prevented from shrinking or warping.

The dust-collecting chamber 12 is suitably supported in the case at a convenient point between the tracker-board and the primary-valve chamber and comprises a bar 53, having two parallel rows of pockets 54, which are preferably circular and each provided at diametrically opposite points in a horizontal line with slits or kerfs 55, formed for the reception of a fine-wire-gauze dust-arrester 56, which checks the passage of dust to the primary-valve chamber. These dust-pockets are closed by a removable cover 57, which permits the same to be cleaned should they become clogged and retard the passage of air through the air-tubes.

This automatic player is actuated in the ordinary manner, partial vacuum of the exhaust-chambers being induced by motion of the foot-pedals and exhaust-bellows. The perforated music-sheet is caused to travel over the tracker-board for the purpose of covering and uncovering the air-openings therein. The air entering the openings in the tracker-board through the perforations in the music-sheet passes through the air-tubes 13 and the dust-chamber and enters the primary-valve chamber to actuate the corresponding valves through the action of the air against the pneumatic pouches in connection therewith. This allows the outer air to enter the air-apertures 44 and pass through air-passages 43 43 to the corresponding secondary pneumatic pouches 45, acting against the same to actuate the secondary valves connected therewith, which action of the valves opens the passages to the exhaust-chamber 42 and simultaneously cuts off the outer air, thus connecting the actuating-pneumatics with the exhaust-chamber through the openings 49 and passages 50 and causing collapsing of the same. When said openings in the tracker-board are closed by the music-sheet, motion of the valves and pneumatic pouches is reversed, the air underneath the primary pouches escaping through air-vents 29 in the pouch-board. The reverse motion of the pouches and valves causes the actuating-pneumatics to be placed in communication with the outer air, and these pneumatics are caused to expand by means of a spring in the heel of each pneumatic, (common and not shown,) the air entering said pneumatic through openings 48. It is therefore apparent that the action of the various parts is not new, and no attempt will be herein made to particularly describe the same, the foregoing being deemed sufficient to permit any person skilled in the art to which this invention appertains to make and use the same.

Having thus described our invention, what we claim is—

1. The combination of an exhaust-chamber, and valve-chambers arranged at opposite sides of the exhaust-chamber.

2. The combination of an exhaust-chamber, and valve-chambers arranged at opposite sides of the exhaust-chamber and connected with the latter by air-passages of uniform or approximately uniform length.

3. The combination of an exhaust-chamber, and valve-chambers affixed to opposite sides of the exhaust-chamber and communicating with the latter by horizontal air-passages.

4. The combination of an exhaust-chamber, valve-chambers lying on opposite sides of said exhaust-chamber, and a series of actuating-pneumatics mounted on each secondary-valve chamber.

5. The combination of an exhaust-chamber, a primary-valve chamber mounted on the exhaust-chamber, secondary-valve chambers lying on opposite sides of the exhaust-chamber and air-passages connecting the primary-valve chamber with the secondary-valve chamber.

6. The combination of an exhaust-chamber formed of two parts secured together and having coinciding grooves to form a chamber, a primary-valve chamber, and air-passages connecting the ends of said exhaust-chamber with the primary-valve chamber.

7. An exhaust-chamber formed of two parts secured together and having coinciding longitudinal grooves to form a chamber, said chamber having end air-passages and side air-passages.

8. The combination of an exhaust-chamber, a primary-valve chamber mounted on said exhaust-chamber, secondary-valve chambers lying on opposite sides of the exhaust-chamber and connected therewith by passages of uniform or approximately uniform length, and actuating-pnumatics mounted on the secondary-valve chambers and lying on opposite sides of the primary-valve chamber.

9. In a valve-chamber, a valve-board chambered to receive valves and bored to form air-passages and plugs closing part of the bores to strengthen the valve-board.

10. In a valve-chamber, a valve-board chambered to receive valves and having transverse bores and vertical bores to form air-passages, and plugs entering said transverse bores and closing a portion of their length to strengthen the valve-boards.

11. In a valve-chamber, a valve-board chambered to receive valves and having transverse bores and vertical bores to form air-passages, and plugs entering said transverse bores and closing a portion of their length to strengthen the valve-boards, said plugs being of wood and having the grain thereof crossing the grain of the valve-board.

12. The combination of an exhaust-chamber formed of two parts secured together and each having a longitudinal groove in its opposing face and transverse openings extending from the longitudinal grooves to the outer sides thereof, said longitudinal grooves forming an air-chamber, and secondary-valve chambers located on opposite sides of the exhaust-chamber and being connected with the air-space in the latter by said transverse openings.

13. In a primary-valve chamber, a valve-board having bores therethrough, bushings held in said bores, air-passages extending transversely from said bushings to the edge of said valve-board, air-openings extending from the space above said valve-board to said transverse passages, and valves having each a stem guided in said bushings and being adapted to open and close said air-openings.

14. In a primary-valve chamber, a valve-board having plugs extending therethrough and bored to form bushings, valves having each a stem guided in said bushings, transverse passages extending from said bushings to the edge of the valve-board, and air-openings extending from said transverse passages outward and adapted to be opened and closed by said valves.

In testimony whereof we have affixed our signatures in the presence of two subscribing witnesses.

JOSEPH HERBERT CHASE.
WILLIAM FREDERICK BAYER.

Witnesses:
WM. C. LANGMANN,
L. J. BUNDY.